United States Patent
Krishna et al.

(10) Patent No.: US 11,630,435 B2
(45) Date of Patent: Apr. 18, 2023

(54) METHOD AND SYSTEM FOR MONITORING TOOL WEAR TO ESTIMATE RUL OF TOOL IN MACHINING

(71) Applicant: Tata Consultancy Services Limited, Mumbai (IN)

(72) Inventors: Ankur Krishna, Pune (IN); Bilal Muhammed, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/976,833

(22) PCT Filed: Oct. 9, 2019

(86) PCT No.: PCT/IN2019/050748
§ 371 (c)(1),
(2) Date: Aug. 31, 2020

(87) PCT Pub. No.: WO2020/075191
PCT Pub. Date: Apr. 16, 2020

(65) Prior Publication Data
US 2021/0356934 A1  Nov. 18, 2021

(30) Foreign Application Priority Data
Oct. 12, 2018 (IN) .............................. 201821038822

(51) Int. Cl.
*G05B 19/4065* (2006.01)
*G01N 3/58* (2006.01)

(52) U.S. Cl.
CPC .......... *G05B 19/4065* (2013.01); *G01N 3/58* (2013.01); *G05B 2219/37252* (2013.01); *G05B 2219/50276* (2013.01)

(58) Field of Classification Search
CPC ...... G05B 19/4065; G05B 2219/37252; G05B 2219/50276; G05B 2219/41376; G01N 3/58; G01N 2203/0218
See application file for complete search history.

(56) References Cited

U.S. PATENT DOCUMENTS 4,442,494 A   4/1984  Fromson et al.
5,689,062 A * 11/1997  Jawahir .................... G01N 3/58
                                                73/104

(Continued)

*Primary Examiner* — Kenneth M Lo
*Assistant Examiner* — Tameem D Siddiquee
(74) *Attorney, Agent, or Firm* — Finnegan, Henderson, Farabow, Garrett & Dunner, LLP

(57) ABSTRACT

Tool wear monitoring is critical for quality and precision of manufacturing of parts in the machining industry. Existing tool wear monitoring and prediction methods are sensor based, costly and pose challenge in ease of implementation. Embodiments herein provide method and system for monitoring tool wear to estimate Remaining Useful Life (RUL) of a tool in machining is disclosed. The method provides a tool wear model, which combines tool wear physics with data fitting, capture practical considerations of a machining system, which makes the tool wear prediction and estimated RUL more stable, reliable and robust. Further, provides cost effective and practical solution. The disclosed physics based tool wear model for RUL estimation captures privilege of physics of tool wear and easily accessible data from CNC machine to monitor and predict tool wear and RUL of the tool in real-time.

6 Claims, 5 Drawing Sheets

(56) References Cited

U.S. PATENT DOCUMENTS

| | | |
|---|---|---|
| 2004/0083009 A1 | 4/2004 | Curless et al. |
| 2012/0234143 A1* | 9/2012 | Fontaine ............... C23C 14/325 |
| | | 204/192.15 |
| 2016/0091393 A1* | 3/2016 | Liao ...................... G01M 13/00 |
| | | 702/34 |
| 2016/0290906 A1* | 10/2016 | Rancic .................... G01N 3/56 |
| 2018/0272491 A1* | 9/2018 | Yang ................... H04L 41/5041 |

* cited by examiner

| Machining Cycle | Cutting Power (KW) $S_p$ | Cutting Speed (m/min) V | Axial Depth of Cut (mm) | Radial Depth of cut (mm) | Kw | Experimental Wear | Predicted Wear | Absolute Error |
|---|---|---|---|---|---|---|---|---|
| 1 | 3.606 | 149 | 3 | 1 | 1 | 0.1 | 0.071678 | 0.028322 |
| 2 | 3.8485 | 149 | 3 | 1 | 1.04 | 0.17 | 0.148826 | 0.021174 |
| 3 | 3.8485 | 149 | 3 | 1 | 1.08 | 0.23 | 0.226578 | 0.003422 |
| 4 | 3.9091 | 149 | 3 | 1 | 1.12 | 0.31 | 0.306131 | 0.003869 |
| 5 | 4.06 | 149 | 3 | 1 | 1.16 | 0.41 | 0.389315 | 0.020685 |
| 6 | 4.2727 | 149 | 3 | 1 | 1.20 | 0.49 | 0.477411 | 0.012589 |
| 7 | 4.2121 | 149 | 3 | 1 | 1.24 | 0.57 | 0.564772 | 0.005228 |
| 8 | 4.333 | 149 | 3 | 1 | 1.28 | 0.69 | 0.655139 | 0.034861 |
| 9 | 4.5455 | 149 | 3 | 1 | 1.32 | 0.77 | 0.750431 | 0.019569 |
| 10 | 4.8182 | 149 | 3 | 1 | 1.36 | 0.86 | 0.851936 | 0.008064 |

FIG. 4A

METHOD AND SYSTEM FOR MONITORING TOOL WEAR TO ESTIMATE RUL OF TOOL IN MACHINING

PRIORITY

The present application is a U.S. National Stage Filing under 35 U.S.C. § 371 and claims priority from International Application No. PCT/IN2019/050748 filed on Oct. 9, 2019, which application claims priority under 35 U.S.C. § 119 from India Application No. 201821038822, filed on Oct. 12, 2018. The entire contents of the aforementioned application are incorporated herein by reference.

TECHNICAL FIELD

The disclosure herein generally relates to monitoring tool wear, and, more particularly, to for a method and system for monitoring tool wear to estimate Remaining Useful Life (RUL) of tool in machining.

BACKGROUND

Machining refers to one or more processes in which a piece of raw material is cut into a desired final shape and size by a controlled material-removal process. Quality and precision in manufacturing of parts is critical in the machining industry. There are parts to be manufactured that require uncompromising quality with very low acceptable tolerances. Among a plurality of factors that affect the quality and/or precision of machining process, tool wear is one major factor. The tool wear directly causes poor part quality and inaccuracies in dimensions of a part, also referred as a workpiece. This effectively leads to rejection of the workpiece or the part. Tool wear is obvious in machining process, hence, changing the tool at right the time is critical for maintaining quality and precision. The existing challenge in achieving high quality and precision in any machining process is that there is no cost-effective and robust technology available to facilitate worn tool change during machining.

Conventionally, in a shop floor, the tool change is based on operator expertise. Further, many existing automated tool wear monitoring techniques are based on sensors and signal processing. These techniques perform satisfactorily in lab scale setup, but they are not cost-effective and robust to use on industrial scale. As these systems use signal patterns to identify features and use them to make predictions, they may not be actually capturing the tool wear physics that is happening. This may lead to providing faulty predictions due to the interference of external noise signals. A considerable research is carried out in machine learning techniques for tool wear monitoring. However, machine learning approaches used by existing tool wear monitoring are very specific to machining condition and require a large volume of data to train a tool wear model. Collecting the required large volume of data from the shop floor is not easy as mounting and collecting a lot of sensory data is a major challenge. In addition, the machine learning model is specific to the type of machining process and a new model needs to be developed as the job changes in a machining process. Some research works in this domain are entirely dependent on the variation of a single parameter (cutting force, temperature, etc.) to predict the tool wear. These works may not take into consideration, all the main factors that affect the tool wear and hence providing a less accurate model for tool wear.

SUMMARY

Embodiments of the present disclosure present technological improvements as solutions to one or more of the above-mentioned technical problems recognized by the inventors in conventional systems. For example, in one aspect, there is provided a processor implemented method for monitoring tool wear to estimate Remaining Useful Life (RUL) of a tool. The method comprising obtaining a plurality of process parameters associated with machining process of a work piece, wherein the plurality of process parameters, comprising a spindle power ($S_p$), a radial depth of cut (w) of the tool, an axial depth of cut t of the tool, and a cutting velocity V, are obtained directly from a Computer Numerical Control (CNC) machine. The method further comprises deriving a rate of volumetric wear loss per unit contact area of the tool in terms of a rate of change of flank wear width $$\left(\frac{dVB}{dt}\right)$$

of the tool. The rate of change of flank wear width $$\left(\frac{dVB}{dt}\right)$$

is computed using the spindle power ($S_p$), the radial depth of cut (w), the axial depth of cut t of the tool, the cutting velocity V, predetermined constants $A_1$ and $B_1$ defined in accordance with a combination of the tool and material of the work piece, and a predetermined temperature wear coefficient ($K_w$). The temperature wear coefficient $K_w$ considers effect of temperature rise due to friction caused by current tool wear state of the tool during the machining operation. Further, the method comprises determining, by the one or more hardware processors, a cumulative flank wear growth (VB) for a current time instant by summing the rate of change of flank wear width $$\left(\frac{dVB}{dt}\right)$$

for a plurality of cuts performed by the tool for a plurality of parts during the machining operation. Furthermore, the method comprises estimating the RUL of the tool at the current time instant from the determined cumulative flank wear growth ($V_B$) and a maximum allowed value for the cumulative flank tool wear predefined for the tool. Furthermore, the method comprises seamlessly indicating the determined RUL to an operator and raising an alarm if the RUL crosses a predefined RUL threshold of the tool.

In another aspect, there is provided a system for monitoring tool wear to estimate Remaining Useful Life (RUL) of a tool, the system comprising a memory storing instructions; one or more communication interfaces; and one or more hardware processors coupled to the memory via the one or more communication interfaces, wherein the one or more hardware processors are configured by the instructions to obtain a plurality of process parameters associated with machining process of a work piece, wherein the plurality of process parameters, comprising a spindle power ($S_p$), a radial depth of cut (w) of the tool, an axial depth of cut t of the tool, and a cutting velocity V, are obtained directly from a Computer Numerical Control (CNC) machine. Further, the system is configured to derive a rate of volumetric wear loss per unit contact area of the tool in terms of a rate of change of flank wear width $$\left(\frac{dVB}{dt}\right)$$

of the tool, wherein the rate of change of flank wear width $$\left(\frac{dVB}{dt}\right)$$

is computed using the spindle power ($S_p$), the radial depth of cut (w), the axial depth of cut t of the tool, the cutting velocity V, predetermined constants $A_1$ and $B_1$ defined in accordance with a combination of the tool and material of the work piece, and a predetermined temperature wear coefficient ($K_w$), wherein the temperature wear coefficient $K_w$ considers effect of temperature rise due to friction caused by a current tool wear state of the tool during the machining operation. Further, the system is configured to determine a cumulative flank wear growth (VB) for a current time instant by summing the rate of change of flank wear width $$\left(\frac{dVB}{dt}\right)$$

for a plurality of cuts performed by the tool for a plurality of parts during the machining operation. Furthermore, the system is configured to estimate the RUL of the tool at the current time instant from the determined cumulative flank wear growth ($V_B$) and a maximum allowed value for the cumulative flank tool wear predefined for the tool and seamlessly indicate the determined RUL to an operator and raising an alarm if the RUL crosses a predefined RUL threshold of the tool.

In yet another aspect, there are provided one or more non-transitory machine readable information storage mediums comprising one or more instructions which when executed by one or more hardware processors causes a method for monitoring tool wear to estimate Remaining Useful Life (RUL) of a tool. The instructions cause obtaining a plurality of process parameters associated with machining process of a work piece, wherein the plurality of process parameters, comprising a spindle power ($S_p$), a radial depth of cut (w) of the tool, an axial depth of cut t of the tool, and a cutting velocity V, are obtained directly from a Computer Numerical Control (CNC) machine. The method further comprises deriving a rate of volumetric wear loss per unit contact area of the tool in terms of a rate of change of flank wear width $$\left(\frac{dVB}{dt}\right)$$

of the tool. The rate of change of flank wear width $$\left(\frac{dVB}{dt}\right)$$

is computed using the spindle power ($S_p$), the radial depth of cut (w), the axial depth of cut t of the tool, the cutting velocity V, predetermined constants $A_1$ and $B_1$ defined in accordance with a combination of the tool and material of the work piece, and a predetermined temperature wear coefficient ($K_w$). The temperature wear coefficient $K_w$ considers effect of temperature rise due to friction caused by a current tool wear state of the tool during the machining operation. Further, the method comprises determining, by the one or more hardware processors, a cumulative flank wear growth ($V_B$) for a current time instant by summing the rate of change of flank wear width $$\left(\frac{dVB}{dt}\right)$$

for a plurality of cuts performed by the tool for a plurality of parts during the machining operation. Furthermore, the method comprises estimating the RUL of the tool at the current time instant from the determined cumulative flank wear growth (VB) and a maximum allowed value for the cumulative flank tool wear predefined for the tool. Furthermore, the method comprises seamlessly indicating the determined RUL to an operator and raising an alarm if the RUL crosses a predefined RUL threshold of the tool.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4A and FIG. 4B illustrate comparison between experimental data available in the art corresponding to the tool wear and predicted tool wear by the system of FIG. 1 data, in accordance with an embodiment of the present disclosure.

DETAILED DESCRIPTION OF EMBODIMENTS

Figure 1:
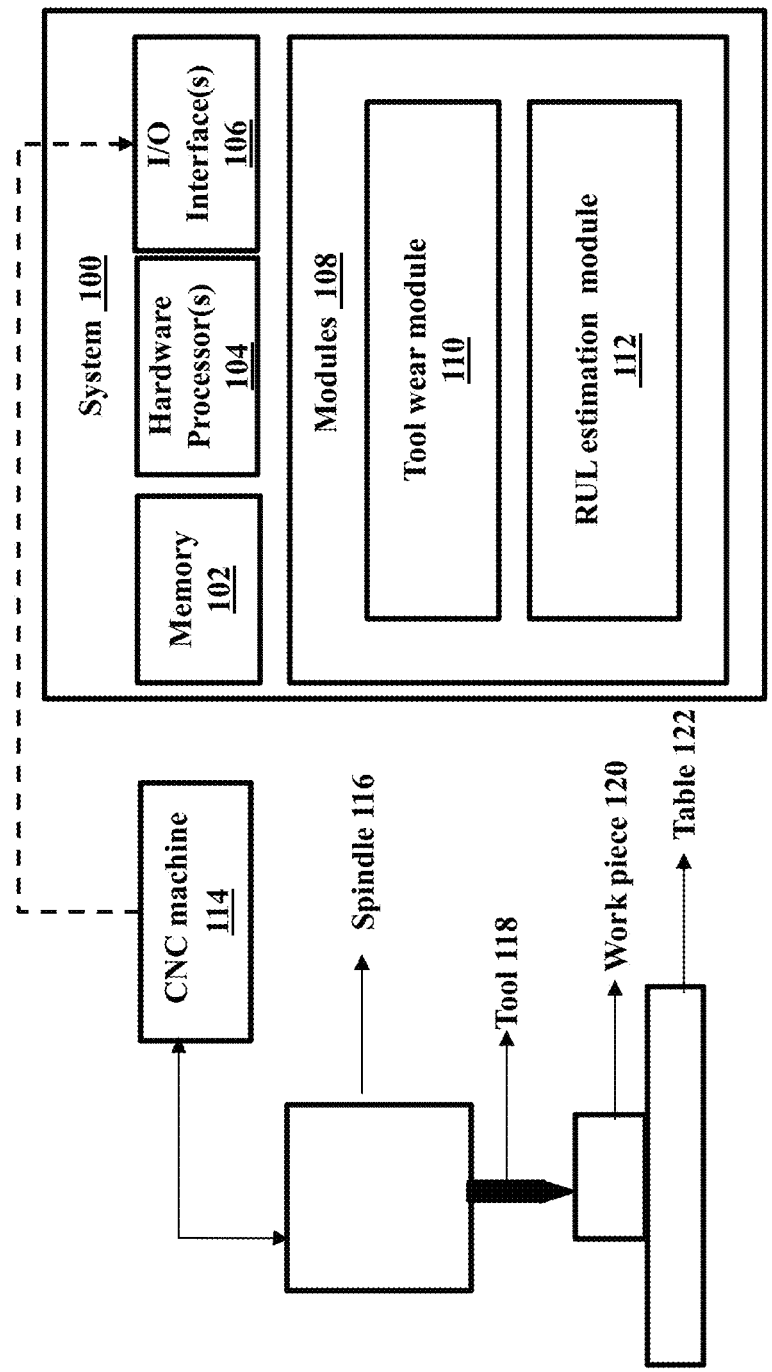
FIG. 1 illustrates an exemplary block diagram of a system for monitoring tool wear to estimate a Remaining Useful Life (RUL) of a tool in machining, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for monitoring tool wear to estimate Remaining Useful Life (RUL) of a tool in machining. The method disclosed provides a tool wear model, which combines tool wear physics with data fitting, capture practical considerations of a machining system, which makes the tool wear prediction and estimated RUL from the tool wear more stable, reliable and robust. The method does not require the mounting of an external sensor on a Computer Numerical Control (CNC) machine, providing cost effective and practical solution, hence widely acceptable and implementable solution on large scale for wide variety of industrial use cases. The disclosed physics based tool wear model for RUL estimation captures privilege of physics of tool wear and easily accessible data from CNC controller to monitor and predict tool wear and RUL of the tool in real-time.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for monitoring tool wear to estimate a Remaining Useful Life (RUL) of a tool 118 in machining, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules (not shown) and/or one or more hardware processors as shown in FIG. 1. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a plurality of modules 108 can be stored in the memory 102, wherein the modules 108 may comprise a tool wear module 110 implementing the physics based tool wear model and a RUL estimation module estimating the RUL based on the predicted tool wear by the tool wear module 110. The tool wear module 110 and the RUL estimation module, when executed by the one or more processors 104, are configured to monitor tool wear to estimate the RUL of the tool 118. The memory 102 may further comprise information pertaining to input(s)/output(s) of each step performed by the tool wear module 110, the RUL estimation module 112 and other modules (not shown) of the system 100 and methods of the present disclosure. The system 100, through the I/O interface 106 may be coupled to external data sources such as the CNC machine 114 providing a plurality of process parameters associated with machining process of manufacturing a workpiece 120, placed on a table 122, utilizing the tool 118. The tool 118 is operated on the work piece 120 in conjunction with a spindle 116 controlled by the CNC machine 114. The plurality of process parameters comprise a spindle power ($S_p$), a radial depth of cut (w) of the tool 118 used in the machining process, an axial depth of cut t of the tool 118, and a cutting velocity V, wherein the plurality of process parameters are obtained directly from the CNC machine 114. The tool wear computation and the estimation of the RUL in accordance with the physics based model disclosed in explained in conjunction method steps depicted by a flow diagram of FIG. 2.

Figure 2:
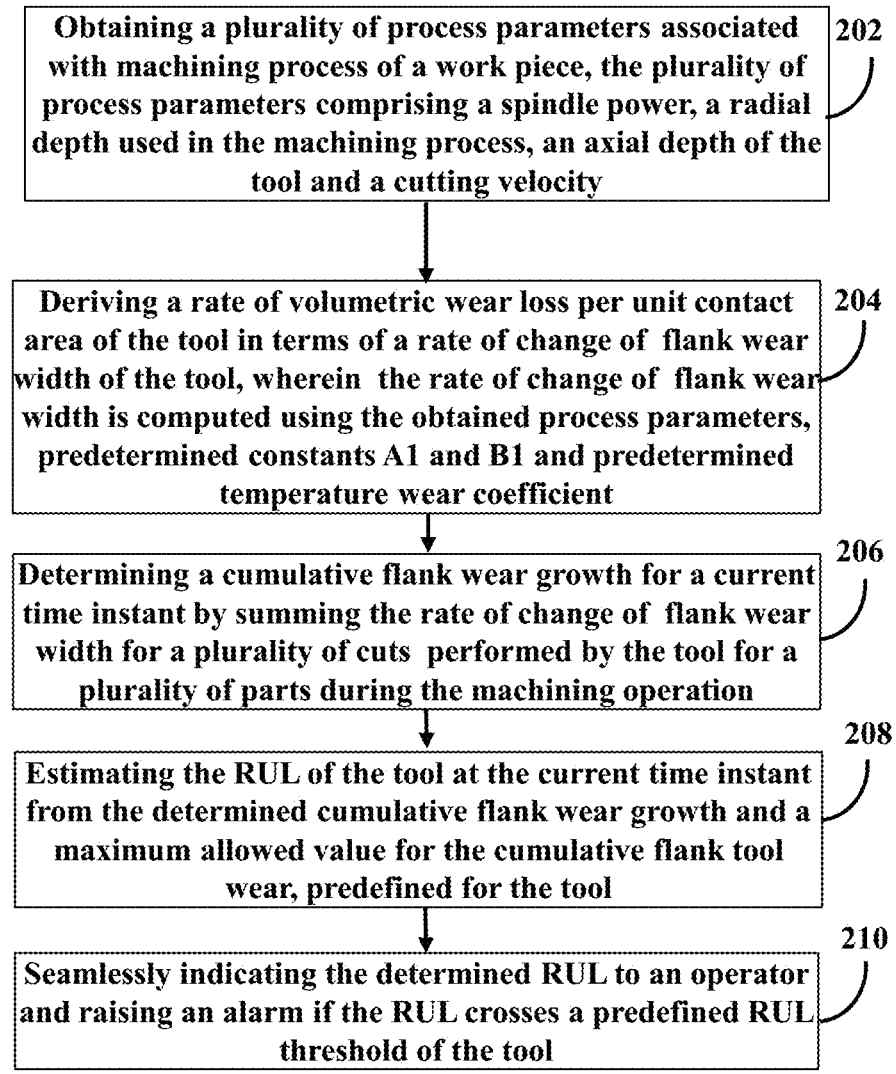
FIG. 2 illustrates an exemplary flow diagram of a method, implemented by the system of FIG. 1, for monitoring tool wear to estimate the RUL of the tool in machining, in accordance with an embodiment of the present disclosure.

FIG. 2 illustrates an exemplary flow diagram of a method, implemented by the system of FIG. 1, for monitoring tool wear to estimate the RUL of the tool in machining, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104 in conjunction with various modules such as the tool wear module 110 and the RUL estimation module 112 of the modules 110. The steps of the method of the present disclosure will now be explained with reference to the components of the system 100 as depicted in FIG. 1, and the steps of flow diagram as depicted in FIG. 2A and FIG. 2B. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment, at step 202 of the method, the tool wear module 110 is configured to obtain the plurality of process parameters associated with machining process of the work piece 120. The plurality of process parameters include the spindle power ($S_p$) of the spindle 116, the radial depth of cut (w) of the tool 118 used in the machining process, the axial depth of cut t of the tool 118, and the cutting velocity V, which are obtained directly from the CNC machine 114.

At step 204 of the method, the tool wear module 110 is configured to derive a rate of volumetric wear loss per unit contact area of the tool 118 in terms of a rate of change of flank wear width $\left(\frac{dVB}{dt}\right)$ of the tool, alternatively referred as rate of change of flank wear growth. The rate of change of flank wear width $\left(\frac{dVB}{dt}\right)$ is computed using the spindle power ($S_p$), the radial depth of cut (w), the axial depth of cut t of the tool, the cutting velocity V, predetermined constants $A_1$ and $B_1$ defined in accordance with a combination of the tool 118 and material of the work piece 120. The computation of the rate of change of flank wear width $\left(\frac{dVB}{dt}\right)$ also depends on a predetermined temperature wear coefficient ($K_w$). Further, the constants $A_1$ and $B_1$ defined in accordance with the combination of the tool 118 and the material of the work piece 120 are predetermined by fitting data for a selected combination of the tool 118, the work piece material and previous machining data using least square fitting technique.

The equation defined by the system and method disclosed for the rate of change of flank wear width $\left(\frac{dVB}{dt}\right)$, alternatively referred as linear rate of flank wear growth providing the physical tool wear model, in terms of process parameters obtained from the CNC machine 114 is provided below:

$$\frac{dVB}{dt} = A_1 \left[\frac{S_p}{wt}\right] \exp\left(\frac{-B_1}{K_w V^{1/2} t^{1/2}}\right) \quad (1)$$

Explained below are steps based on which the method disclosed arrives at equation (1) stated above. The derivation of the disclosed equation 1 is developed over, known in art, basic tool wear model based on dominant tool wear mechanism, which is abrasion in cutting zone. Accordingly, a tool wear rate, alternatively referred as wear rate, depends upon a sliding velocity $V_c$ and the wear rate equation is as provided below:

$$\frac{dw}{dt} = A\sigma_n V_c \exp(-B/T) \quad (2)$$

Figure 3:
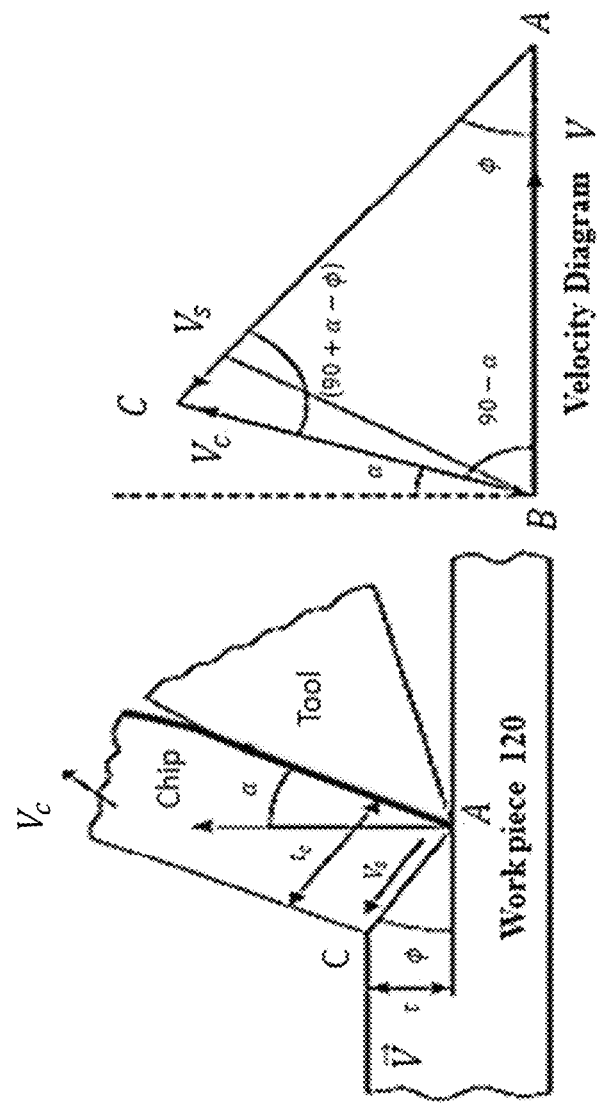
FIG. 3 illustrates a standard Velocity Relationship in orthogonal cutting providing the basic equation of sliding velocity.

Wherein, the sliding velocity $V_c$ is derived based on a standard Velocity Relationship in orthogonal cutting as depicted in FIG. 3

Using equation 1 and equation 2, the wear rate equation can be modified as below:

$$\frac{dw}{dt} = A\left[\frac{\sin(\phi + \lambda - \alpha)\sin^2\phi}{\cos(\lambda - \alpha)\sin(90 + \lambda - \phi)}\right]\left[\frac{F_c V_c}{wt}\right]\exp(-B/T) \quad (3)$$

Further, to model temperature effect T present in equation 2 in tool wear, nature of variation of overall tool-chip interface temperature with the process parameters can be approximately determined through the dimensional analysis as known in the art and provided in equation below:

$$T \propto U_c \sqrt{\frac{Vt}{K\rho c}} \quad (4)$$

Where $U_c$ is specific energy of material removal, V is the cutting velocity, t is the uncut chip thickness, k the thermal conductivity of cutting material, $\rho$ the density of cutting material, c is the specific heat capacity of the cutting material (tool material). The equation 4 above does not take into consideration, the temperature rise due to the current tool wear state. However, it is experimentally observed by analysis in the art that the presence of a tool wear state causes a rise in temperature due to more friction as contact area increases with wear. The method and system disclosed introduces the temperature wear coefficient $K_w$, which considers effect of temperature rise due to friction caused by a current tool wear state of the tool 118 during the machining operation. It is experimentally identified that, the temperature can increase till 40%, before a tool fails. The temperature wear coefficient ($K_w$) is tuned from previous data associated with the machining process and is provided by equation below:

$$T \propto K * K_w U_c \sqrt{\frac{vt1}{k\rho c}} \quad (5)$$

Where K, is constant of proportionality.

Using the equation 5 in equation 3 and simplifying in further using a shear model developed in art that provides shear angle relationship, the tool wear rate equation can be written as:

$$\frac{dw}{dt} = A_1 \left[\frac{F_c V}{wt}\right]\exp\left(-B/K_w V^{1/2} t^{1/2}\right) \quad (6)$$

In the above equation $F_c V$ provides instantaneous cutting power which is proportional to the spindle power $S_p$. Thus, the instantaneous cutting power can be approximated as the spindle power $S_p$, wherein the constant in equation 7 takes into account the constant of proportionality. Thus, the wear rate of equation 6 can be represented in terms of spindle power $S_p$, as in equation 7:

$$\frac{dw}{dt} = A_1 \left[\frac{S_p}{wt}\right]\exp\left(-B/K_w V^{1/2} t^{1/2}\right) \quad (7)$$

The tool wear mechanism are of two types, a flank wear and a crater wear. As observed that the flank wear occurs much before the crater wear occurs, hence the flank wear is better and early indication of tool failure. Thus, the analysis hence forth with regards to tool wear rate is analyzed and described in terms of flank wear. Thus, the rate of change of flank width or the rate of change of flank wear growth can be written based on equation 7 above as:

$$\frac{dVB}{dt} = A_1 \left[\frac{S_p}{wt}\right] \exp(-B/K_w V^{1/2} t^{1/2}), \quad (8)$$

which is the same equation 1, stated above.

Once the computation for rate of change of flank width is known, at step 206 of the method, the tool wear module 110 is configured to determine a cumulative flank wear growth (VB) for a current time instant by summing the rate of change of flank wear width $$\left(\frac{dVB}{dt}\right)$$

for a plurality of cuts performed by the tool for a plurality of parts during the machining operation. The cumulative flank wear growth is as provided below:

$$VB(t) = \sum_{No\_of\_parts} \sum_{No\_of\_Cuts\_per\_part} \int_0^{t\_cut} \frac{dVB}{dt} dt \quad (9)$$

Upon computation of the cumulative flank wear growth VB (t), at step 208 of the method, the RUL estimation module 112 is configured to estimate the RUL of the tool at the current time instant from the determined cumulative flank wear growth (VB) and a maximum allowed value for the cumulative flank tool wear ($VB_{max\_allowed}$) predefined for the tool. The RUL is estimated using the standard RUL equation below:

$$RUL = \left(1 - \frac{VB(t)}{VB_{max\_allowed}}\right) \quad (10)$$

At step 210 of the method, the RUL estimation module 112 is configured to seamlessly indicating the determined RUL to an operator and raising an alarm if the RUL crosses a predefined RUL threshold of the tool.

Figure 4B:
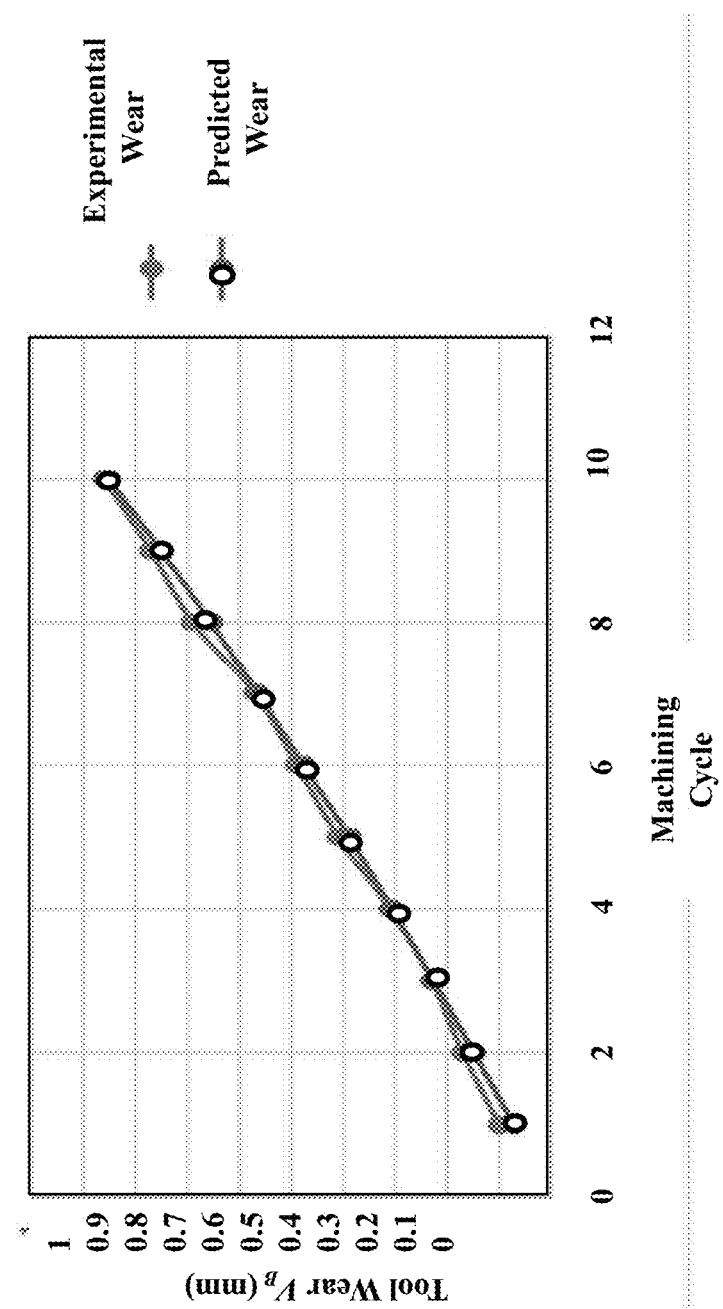

FIG. 4A and FIG. 4B illustrate comparison between experimental data available in the art corresponding to the tool wear and predicted tool wear by the system of FIG. 1 data, in accordance with an embodiment of the present disclosure. For the comparative analysis, the physics based tool wear model (as in equation 1) developed by the method disclosed is trained using published tool wear data as in table depicted in FIG. 4A. The cutting experiments, are carried out on horizontal column-knee type milling machine. The data acquisition system was composed of a motor power transducer, an A/D converter and a personal computer. Flank wear of a carbide insert was measured using a microscope. Milling experiments is carried out under different cutting conditions. The tool wear model is trained against the cutting condition V=149 m/min, w=3 and t=1 mm. The predicted results by the system 100, show good agreement with the experimental data as shown in table of FIG. 4A. The graphical comparison is depicted in FIG. 4B. After training, the constants, or coefficients $A_1$ and $B_1$ in the equation 1 are determined to be $A_1$=0.073441 and $B_1$=2.6829, where the tool wear rate is calculated as in equation 11 below:

$$\frac{dVB}{dt} = 0.073441 \left[\frac{S_p}{wt}\right] \exp(-2.6829/K_w V^{1/2} t^{1/2}) \quad (11)$$

The observed Root Mean Square Error (RMSE) is 1.88%, which may increase further if the tool wear model is trained with a large data set with different cutting conditions. At any point in time during the machining process, the RUL of the tool can be calculated from equation 10. If assumed that maximum allowable tool wear for a specific machining process is ($VB_{max_{allowed}}$)=0.8 mm, then actual and predicted RUL after 6 the machining cycle is:

$$RUL_{predicted} = 1 - \frac{0.4777}{0.8}, RUL_{actual} = 1 - \frac{0.49}{0.8}$$

So the predicted RUL after 6 the machining cycle is 40.35% while actual is 38.75%. Since tool wear is directly related to tool wear compensation, the method disclosed, with minimal modifications can automatically correlate between tool wear occurring and tool wear compensation to the provided to reduce part or workpiece dimensional inaccuracy.

Thus, physics based model disclosed by the method not only depends on the machining data but also the associated physics of tool wear which remains same across the machining operations. So by incorporating a minimal changes (By estimating $A_1$ and $B_1$ and tuning $K_w$) the model is ready to predict tool wear and estimate RUL for another set of new job tool combination. So proposed model is completely flexible and extensible from turning to milling operation provided orthogonal machining condition. Also an algorithm can be written to train of model automatically from few set of initial machining data in case of new set of machining condition including change in job and tool. This make system automatic, agile, self-depend and available most of time in changing machining conditions. This leads to better productivity, cost-effective manufacturing process The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for monitoring tool wear to estimate Remaining Useful Life (RUL) of a tool, the method comprising:

obtaining, by one or more hardware processors, a plurality of process parameters associated with machining process of a work piece, wherein the plurality of process parameters, comprising a spindle power ($S_p$), a radial depth of cut (w) of the tool, an axial depth of cut t of the tool, and a cutting velocity V, are obtained directly from a Computer Numerical Control (CNC) machine;

deriving, by the one or more hardware processors, a rate of volumetric wear loss per unit contact area of the tool in terms of a rate of change of flank wear width $$\left(\frac{dVB}{dt}\right)$$

of the tool, wherein the rate of change of flank wear width $$\left(\frac{dVB}{dt}\right)$$

is computed using a physics based tool wear model, wherein the physics based tool wear model is developed using the spindle power ($S_p$), the radial depth of cut (w), the axial depth of cut t of the tool, the cutting velocity V, predetermined constants $A_1$ and $B_1$ defined in accordance with a combination of the tool and material of the work piece, and a predetermined temperature wear coefficient ($K_w$), wherein the temperature wear coefficient $K_w$ considers effect of temperature rise due to friction caused by a current tool wear state of the tool during the machining operation, wherein the constants $A_1$ and $B_1$ defined in accordance with the combination of the tool and the material of the work piece are predetermined by fitting data for a selected combination of the tool and work piece material and previous machining data using least square fitting technique, and wherein the temperature wear coefficient ($K_w$) is tuned from the previous machining data associated with the machining process, using a specific energy of material removal ($U_c$) of the work piece, the cutting velocity V, a uncut chip thickness, a thermal conductivity (K) of the tool material, a density ($\rho$) of the tool material, and a specific heat capacity (c) of the tool material, and wherein the physics based tool wear model is trained using published tool wear data and a set of initial matching data in case of a new set of machining condition including change in a job and the tool thereby making a system automatic, agile, self-depend, and available in changing machining conditions;

determining, by the one or more hardware processors, a cumulative flank wear growth (VB) for a current time instant by summing the rate of change of flank wear width $$\left(\frac{dVB}{dt}\right)$$

for a plurality of cuts performed by the tool for a plurality of parts during the machining operation; and estimating, by the one or more hardware processors, the RUL of the tool at the current time instant from the determined cumulative flank wear growth ($V_B$) and a maximum allowed value for the cumulative flank tool wear predefined for the tool.

2. The method of claim 1, wherein the method further comprises indicating the determined RUL to an operator and raising an alarm if the RUL crosses a predefined RUL threshold of the tool.

3. A system for monitoring tool wear to estimate Remaining Useful Life (RUL) of a tool, the system comprising:

a memory storing instructions;

one or more Input/Output (I/O) interfaces; and one or more hardware processors coupled to the memory via the one or more communication interfaces, wherein the one or more hardware processors are configured by the instructions to:

obtain a plurality of process parameters associated with machining process of a work piece, wherein the plurality of process parameters, comprising a spindle power ($S_p$), a radial depth of cut (w) of the tool, an axial depth of cut t of the tool, and a cutting velocity V, are obtained directly from a Computer Numerical Control (CNC) machine;

derive a rate of volumetric wear loss per unit contact area of the tool in terms of a rate of change of flank wear width $$\left(\frac{dVB}{dt}\right)$$

of the tool, wherein the rate of change of flank wear width $$\left(\frac{dVB}{dt}\right)$$

is computed using a physics based tool wear model, wherein the physics based tool wear model is developed using the spindle power ($S_p$), the radial depth of cut (w), the axial depth of cut t of the tool, the cutting velocity V, predetermined constants $A_1$ and $B_1$ defined in accordance with a combination of the tool and material of the work piece, and a predetermined temperature wear coefficient ($K_w$), wherein the temperature wear coefficient $K_w$ considers effect of temperature rise due to friction caused by a current tool wear state of the tool during the machining operation, wherein the constants $A_1$ and $B_1$ defined in accordance with the combination of the tool and the material of the work piece are predetermined by fitting data for a selected combination of the tool and work piece material and previous machining data using least square fitting technique, and wherein the temperature wear coefficient ($K_w$) is tuned from the previous machining data associated with the machining process, using a specific energy of material removal ($U_c$) of the work piece, the cutting velocity V, a uncut chip thickness, a thermal conductivity (K) of the tool material, a density ($\rho$) of the tool material, and a specific heat capacity (c) of the tool material, and wherein the physics based tool wear model is trained using published tool wear data and a set of initial matching data in case of a new set of machining condition including change in a job and the tool thereby making a system automatic, agile, self-depend, and available in changing machining conditions;

determine a cumulative flank wear growth (VB) for a current time instant by summing the rate of change of flank wear width $$\left(\frac{dVB}{dt}\right)$$

for a plurality of cuts performed by the tool for a plurality of parts during the machining operation; and estimate the RUL of the tool at the current time instant from the determined cumulative flank wear growth (VB) and a maximum allowed value for the cumulative flank tool wear predefined for the tool.

4. The system of claim 3, wherein the one or more hardware processors are further configured by the instructions to indicate the determined RUL to an operator and raise an alarm if the RUL crosses a predefined RUL threshold of the tool.

5. One or more non-transitory machine readable information storage mediums comprising one or more instructions which when executed by one or more hardware processors causes a method for:

obtaining a plurality of process parameters associated with machining process of a work piece, wherein the plurality of process parameters, comprising a spindle power ($S_p$), a radial depth of cut (w) of the tool, an axial depth of cut t of the tool, and a cutting velocity V, are obtained directly from a Computer Numerical Control (CNC) machine;

deriving a rate of volumetric wear loss per unit contact area of the tool in terms of a rate of change of flank wear width $$\left(\frac{dVB}{dt}\right)$$

the tool, wherein the rate of change of flank wear width $$\left(\frac{dVB}{dt}\right)$$

is computed using a physics based tool wear model, wherein the physics based tool wear model is developed using the spindle power ($S_p$), the radial depth of cut (w), the axial depth of cut t of the tool, the cutting velocity V, predetermined constants $A_1$ and $B_1$ defined in accordance with a combination of the tool and material of the work piece, and a predetermined temperature wear coefficient ($K_w$), wherein the temperature wear coefficient $K_w$ considers effect of temperature rise due to friction caused by a current tool wear state of the tool during the machining operation, wherein the constants $A_1$ and $B_1$ defined in accordance with the combination of the tool and the material of the work piece are predetermined by fitting data for a selected combination of the tool and work piece material and previous machining data using least square fitting technique, and wherein the temperature wear coefficient ($K_w$) is tuned from the previous machining data associated with the machining process, using a specific energy of material removal ($U_c$) of the work piece, the cutting velocity V, a uncut chip thickness, a thermal conductivity (K) of the tool material, a density ($\rho$) of the tool material, and a specific heat capacity (c) of the tool material, and wherein the physics based tool wear model is trained using published tool wear data and a set of initial matching data in case of a new set of machining condition including change in a job and the tool thereby making a system automatic, agile, self-depend, and available in changing machining conditions;

determining a cumulative flank wear growth (VB) for a current time instant by summing the rate of change of flank wear width $$\left(\frac{dVB}{dt}\right)$$

for a plurality of cuts performed by the tool for a plurality of parts during the machining operation; and estimating a Remaining Useful Life (RUL) of the tool at the current time instant from the determined cumulative flank wear growth ($V_B$) and a maximum allowed value for the cumulative flank tool wear predefined for the tool.

6. The one or more non-transitory machine readable information storage mediums of claim 5, wherein the one or more instructions which when executed by the one or more hardware processors further cause indicating the determined RUL to an operator and raising an alarm if the RUL crosses a predefined RUL threshold of the too.

* * * * *